(12) United States Patent
Dubey et al.

(10) Patent No.: US 10,293,679 B2
(45) Date of Patent: May 21, 2019

(54) AERODYNAMIC DEVICE TO OPTIMIZE AIR FLOW THROUGH HEAT EXCHANGERS

(71) Applicant: FORD GLOBAL TECHNOLOGIES, LLC, Dearborn, MI (US)

(72) Inventors: Prashant Dubey, Framington, MI (US); Lucas Apandi Phan, Canton, MI (US); Aaron Peter Klop, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 605 days.

(21) Appl. No.: 14/546,353

(22) Filed: Nov. 18, 2014

(65) Prior Publication Data

US 2016/0137053 A1 May 19, 2016

(51) Int. Cl.
*B60K 11/04* (2006.01)
*B60K 11/08* (2006.01)

(52) U.S. Cl.
CPC .............. *B60K 11/08* (2013.01); *B60K 11/04* (2013.01)

(58) Field of Classification Search
CPC ....... B60K 11/04; B60K 11/08; B60K 11/085; B62D 25/081; B62D 25/085
USPC ................................................ 180/68.1, 68.2
See application file for complete search history.

(56) References Cited

U.S. PATENT DOCUMENTS

| | | | |
|---|---|---|---|
| 2,854,104 A * | 9/1958 | Marcy, Jr. | B21D 47/005 52/666 |
| 3,095,147 A | 6/1963 | Abrams | |
| 4,169,501 A * | 10/1979 | Takeuchi | B60K 11/085 123/41.49 |
| 4,916,902 A * | 4/1990 | Pratt | F01P 7/12 123/41.05 |
| 4,938,303 A * | 7/1990 | Schaal | B60H 1/3227 123/41.48 |
| 6,997,490 B2 | 2/2006 | Evans et al. | |
| 7,690,703 B2 * | 4/2010 | Maruko | B60R 19/52 293/102 |
| 8,196,978 B2 * | 6/2012 | Shin | B62D 25/084 180/68.6 |
| 8,196,998 B2 * | 6/2012 | Ohno | B60R 19/48 293/133 |
| 8,463,493 B2 | 6/2013 | Lockwood et al. | |
| 8,708,075 B2 | 4/2014 | Maurer et al. | |
| 2002/0096378 A1 * | 7/2002 | Kobayashi | B60K 11/08 180/68.6 |
| 2004/0104007 A1 * | 6/2004 | Kolb | B60K 11/02 165/41 |
| 2004/0104599 A1 * | 6/2004 | Svendsen | B60R 19/56 296/187.09 |

(Continued)

FOREIGN PATENT DOCUMENTS

WO 2012/177423 A2 12/2012

*Primary Examiner* — James A Shriver, II
*Assistant Examiner* — Vaughn Coolman
(74) *Attorney, Agent, or Firm* — Jason Rogers; Vichit Chea; King & Schickli, PLLC (57) ABSTRACT

An air flow optimization device is provided for motor vehicle heat exchangers. The device includes a body having a first air flow opening with an inlet side and an outlet side. A series of fixed vanes are provided across the opening and divide the opening into a plurality of air flow channels.

17 Claims, 7 Drawing Sheets
(4 of 7 Drawing Sheet(s) Filed in Color)

(56) References Cited

U.S. PATENT DOCUMENTS

| | | | |
|---|---|---|---|
| 2004/0108097 A1* | 6/2004 | Ueda | B60K 11/00 165/42 |
| 2006/0102109 A1* | 5/2006 | Becker | B60K 11/08 123/41.48 |
| 2009/0242296 A1* | 10/2009 | Goldsberry | B60K 13/02 180/68.3 |
| 2010/0244481 A1* | 9/2010 | Ohno | B60R 19/48 296/82 |
| 2011/0203861 A1* | 8/2011 | Charnesky | B60K 11/085 180/68.1 |
| 2011/0204680 A1* | 8/2011 | Fortin | B60R 19/18 296/193.1 |
| 2012/0019025 A1 | 1/2012 | Evans et al. | |
| 2012/0049545 A1* | 3/2012 | Davis | B60K 11/08 293/115 |
| 2012/0110909 A1 | 5/2012 | Crane et al. | |
| 2012/0132474 A1* | 5/2012 | Charnesky | B60K 11/085 180/68.1 |
| 2012/0305818 A1* | 12/2012 | Charnesky | B60K 11/085 251/212 |
| 2013/0036991 A1* | 2/2013 | Kerns | F01P 7/10 123/41.04 |
| 2013/0092462 A1* | 4/2013 | Chinta | B60K 11/08 180/68.1 |
| 2013/0146001 A1* | 6/2013 | Klinkert | B60K 11/08 123/41.56 |
| 2013/0175011 A1 | 7/2013 | Leonard | |
| 2014/0005897 A1* | 1/2014 | Hayakawa | B60K 11/085 701/49 |
| 2014/0132033 A1 | 5/2014 | Townson et al. | |
| 2014/0291056 A1* | 10/2014 | Takanaga | B60K 11/085 180/274 |
| 2015/0028605 A1* | 1/2015 | Maier | B60K 11/04 293/115 |
| 2015/0118949 A1* | 4/2015 | Nam | B60K 13/02 454/155 |

* cited by examiner

AERODYNAMIC DEVICE TO OPTIMIZE AIR FLOW THROUGH HEAT EXCHANGERS

TECHNICAL FIELD

This document relates generally to the vehicle equipment field and, more particularly, to an air flow optimization device for more evenly distributing air flow across motor vehicle heat exchangers.

BACKGROUND

The smooth and uniform distribution of air flow between a grill fascia and the heat exchangers of a motor vehicle may be adversely modified and even disrupted by vehicle components in that airstream. Such components include, but are not necessarily limited to, the bumper beam and bumper beam supports, the radar cruise control module, the front camera module and the like. Further, air flow may be redirected through package gaps: that is gaps between the three primary exchangers which include the radiator, intercooler and condenser. As a consequence, some areas of the heat exchangers may be subjected to high air flow while other areas may be the subjected to low air flow. This leads to uneven temperature distribution in the core of the affected heat exchanger. Under certain situations this unevenness subjects the heat exchanger core to varying coefficients of thermal expansion and uneven heat exchanger tube temperature distribution which may adversely affect the service life of the heat exchanger.

This document relates to an air flow optimization device that is relatively inexpensive to produce and relatively light in weight which more evenly distributes air flow through the heat exchangers to allow those heat exchangers to operate more effectively and at higher efficiency. Advantageously, the air flow optimization device also functions to minimize the effects of varying coefficients of thermal expansion and uneven heat exchanger tube temperature distribution to extend the service life of the heat exchangers.

SUMMARY

In accordance with the purposes and benefits described herein, an aerodynamic device to optimize air flow through heat exchangers is provided. That device comprises a body including a first air flow opening having an inlet side and outlet side and a series of fixed vanes provided across the opening and dividing the opening into a plurality of air flow channels. In one possible embodiment, the fixed vanes extend at least partially across the body from the inlet side to the outlet side. In one possible embodiment, the body includes a first perimeter frame around the first opening. In one possible embodiment, a seal member extends around the first perimeter and projects forwardly from the inlet side.

In one possible embodiment, the body further includes a second air flow opening. A second series of fixed vanes are provided across this second opening and divide the second opening into a second plurality of air flow channels.

In this embodiment the body also includes a second perimeter around the second opening. A second seal member extends around the second perimeter and projects forwardly from the inlet side. In addition, the body further includes a ribbed panel that connects the first and second perimeter frames.

In one possible embodiment of the invention, each air flow channel of the plurality of air flow channels has a cross-sectional area of between about 4300 mm² and about 5450 mm². In another possible embodiment each air flow channel of the plurality of channels has a cross-sectional area of between about 4700 mm² and about 5050 mm².

In one possible embodiment the second air flow opening is below and partially offset from the first air flow opening. Further in one possible embodiment the ratio of the total cross-sectional area of the first air flow opening to the second air flow opening is between about 1.32 to 1 and about 1.25 to 1.

In the following description, there is shown and described several preferred embodiments of the air flow optimization device. As it should be realized, the air flow optimization device is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWING FIGURES

The patent or application file contains at least one drawing executed in color. Copies of this patent or patent application publication with color drawing(s) will be provided by the office upon request and payment of the necessary fee.

The accompanying drawing figures incorporated herein and forming a part of the specification, illustrate several aspects of the air flow optimization device and together with the description serve to explain certain principles thereof. In the drawing figures.

Reference will now be made in detail to the present preferred embodiment of the air flow optimization device, examples of which are illustrated in the accompanying drawing figures.

DETAILED DESCRIPTION

Figure 1:
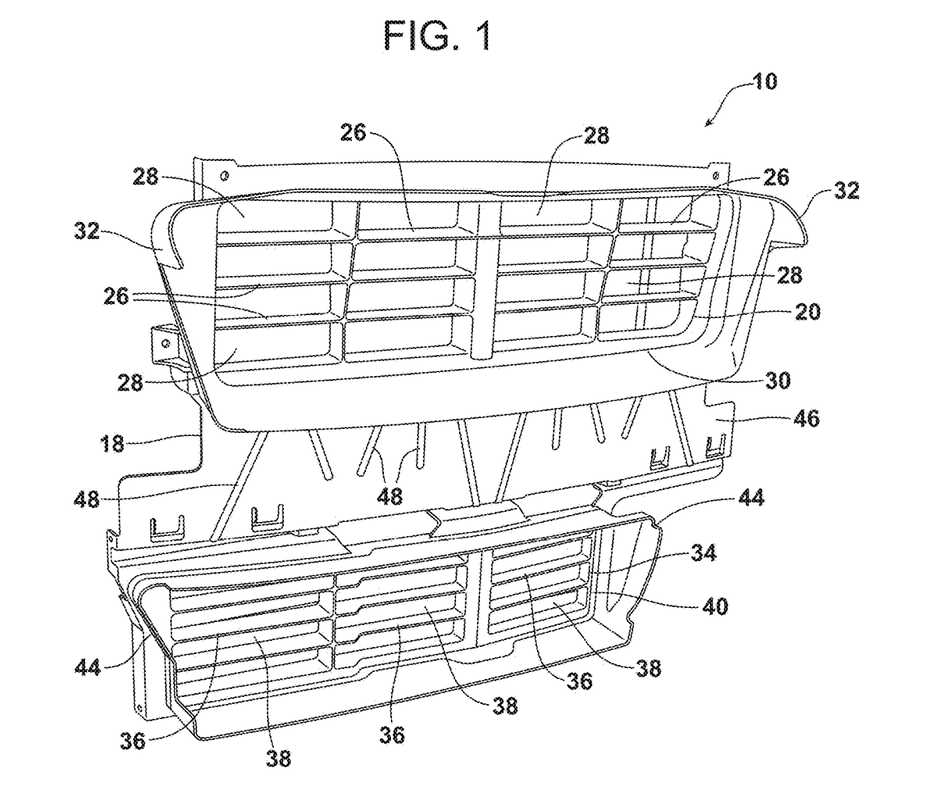
FIG. 1 is a perspective view of the air flow optimization device.
Figure 2:
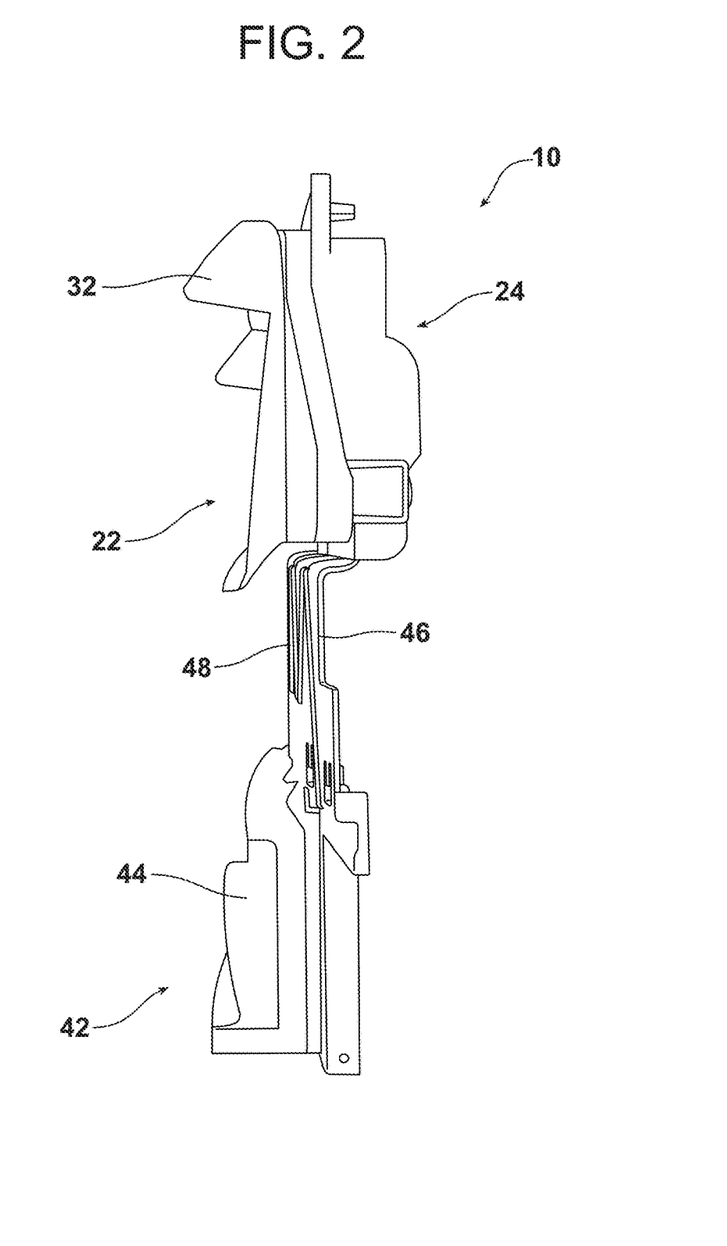
FIG. 2 is a left side elevational view of the air flow optimization device illustrated in FIG. 1.
Figure 3:
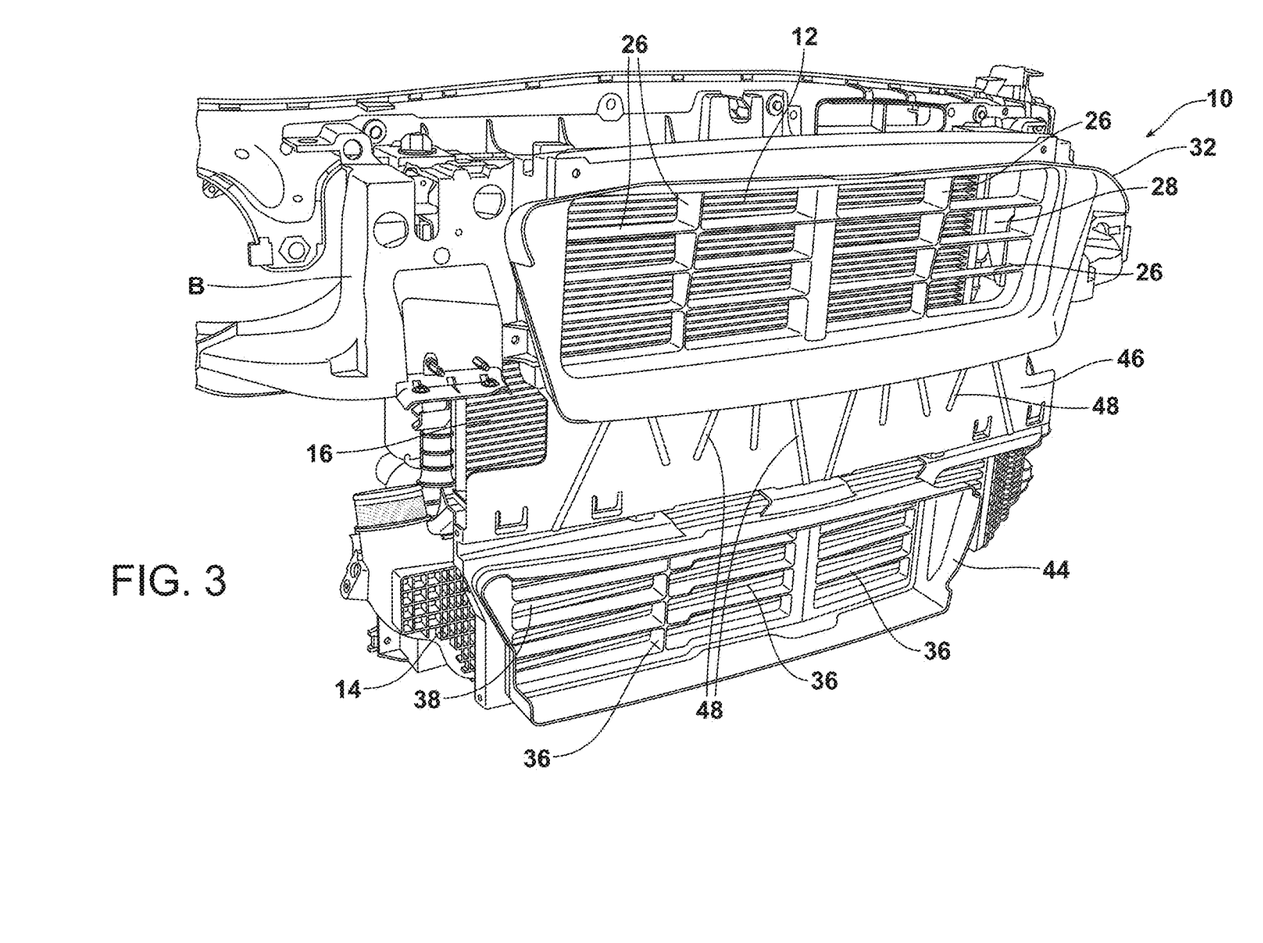
FIG. 3 is another perspective view illustrating the air flow optimization device of FIG. 1 mounted to the bolster in front of the various heat exchangers of the motor vehicle.

Reference is now made to FIGS. 1-3 illustrating the air flow optimization device 10 for providing a smoother and more uniform distribution of air to the heat exchangers of the motor vehicle including, for example, the radiator 12, the intercooler 14 and condenser 16. As illustrated, the device 10 includes a body 18 having a first air flow opening 20. Air flow opening 20 has an upstream or inlet side 22 and a downstream or outlet side 24. A series of fixed vanes 26 are provided across the opening 20 and divide the opening into a plurality of air flow channels 28. The fixed vanes 26 extend at least partially across the body 18 from the inlet side 22 to the outlet side 24. In one possible embodiment, the vanes 26 extend all the way across between the inlet side 22 and the outlet side 24.

As further illustrated, the body 18 includes a first perimeter 30 that extends around the first opening 20. A seal member 32 extends around the first perimeter 30 and projects forwardly from the inlet side 22

As further illustrated in FIGS. 1-3, the body 18 further includes a second air flow opening 34. A second series of fixed vanes 36 are provided across the second opening and divide the second opening into a second plurality of air flow channels 38.

Still further, the body 18 includes a second perimeter 40 extending around the second opening 34 and projecting forwardly from the inlet side 42 of that opening 34. A second seal member 44 extends around the second perimeter 40 and projects forwardly from the inlet side 42. Both seal members 32, 44 may be integrally formed by means of dual-shot injection molding technology if desired.

The body 18 also includes a rigged panel 46 connecting the first and second perimeter frames 30, 40. The ribs 48 add strength to the panel 46 and may be oriented so as to direct air flow toward the air flow channels 28, 38 that then distribute that air across the various heat exchangers 12, 14, 16.

In use, the air flow optimization device 10 is mounted to the bolster B of the vehicle V by appropriate fasteners so as to be positioned between the heat exchangers, such as the radiator 12, intercooler 14, and condenser 16 and the vehicle fascia which has been removed for clarity (see FIG. 3). As should be appreciated, the seal members 32, 44 serve to channel air coming through the fascia into the first and second openings 20, 30 so that the vanes 26, 36 and the resulting air flow channels 28, 30 may more evenly and uniformly distribute air flow through the radiator 12, intercooler 14 and condenser 16 for more effective and efficient cooling.

In one possible embodiment of the invention, each air flow channel 28, 38 of the plurality of air flow channels has a cross-sectional area of between about 4300 mm$^2$ and about 5450 mm$^2$. In another possible embodiment, each air flow channel of the plurality of air flow channels has a cross-sectional area of between about 4700 mm$^2$ and about 5050 mm$^2$. In one possible embodiment, a ratio of the total cross-sectional area of the first air flow opening 20 to the second air flow opening 34 is between about 1.32 to 1 and about 1.25 to 1. Further, in the illustrated embodiment the second air flow opening 34 is below and partially offset from the first air flow opening 20.

As should be appreciated, this document also describes an air flow optimization system for a motor vehicle including a heat exchanger 12, 14 and/or 16 and the air flow optimization device 10. Further, a method is provided for improving the efficiency and performance as well as the service life of a heat exchanger. That method comprises the step of more uniformly distributing air flow through the heat exchanger by directing that air flow through an air flow optimization device 10 including at least one air flow opening 20, 34 including a plurality of fixed vanes 26, 36 dividing the openings into a plurality of air flow channels 28, 38.

The following example is presented to further illustrate the benefits and advantages provided by the air flow optimization device 10 described in this document and illustrated in the drawing Figures.

Example

Figure 4A:
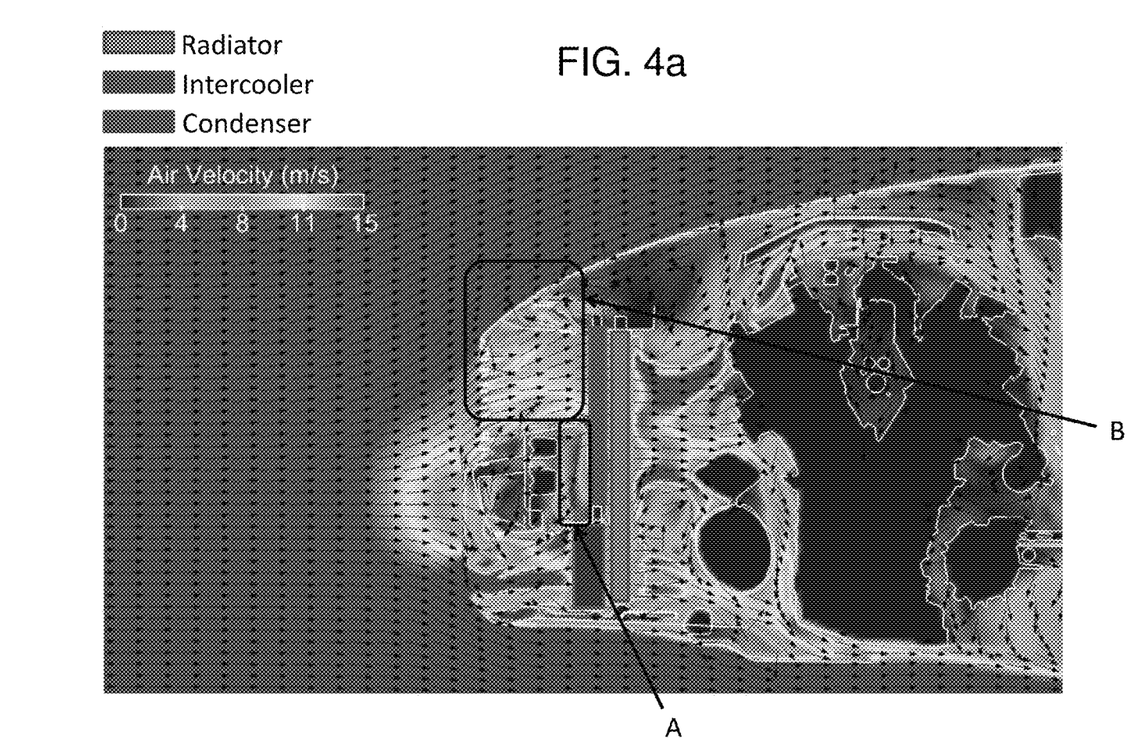
FIGS. 4a and 4b are color illustrations of the computational fluid dynamics analysis and thermal imaging of a vehicle, respectively, in the absence of the air flow optimization device and with the air flow optimization device.
Figure 4B:
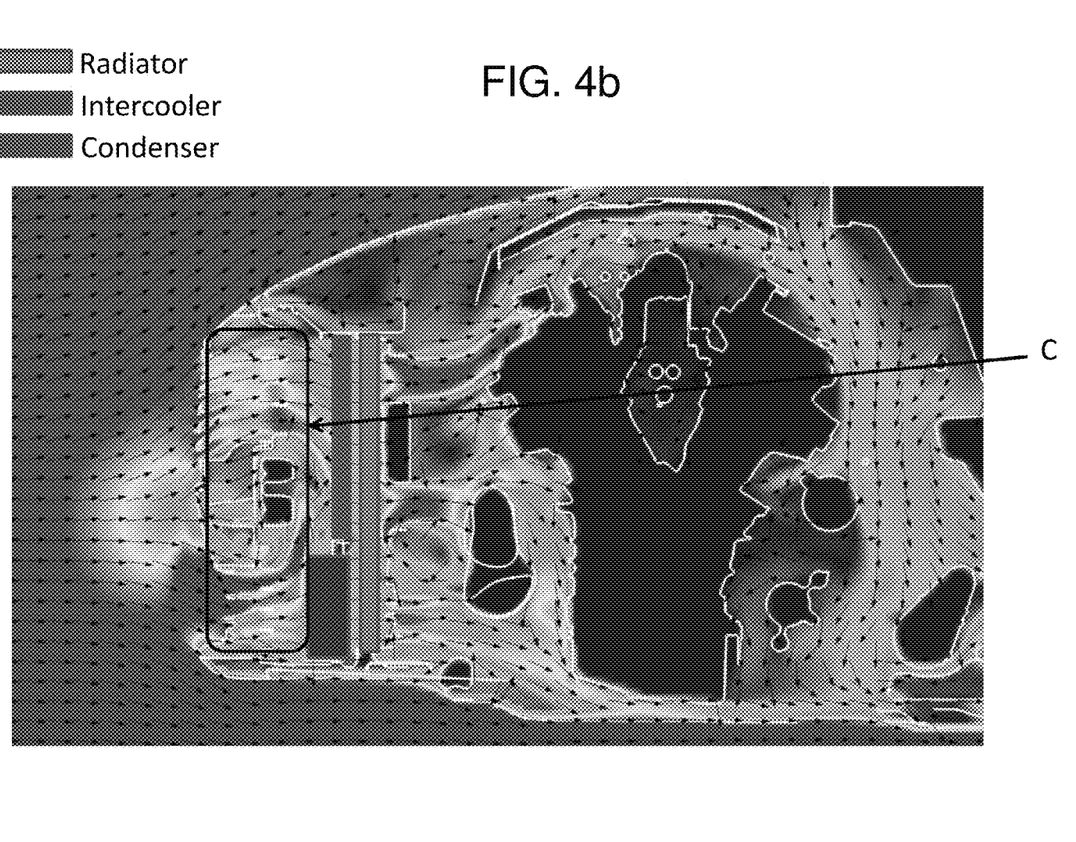

FIGS. 4a and 4b illustrate CFT analysis of air flow, respectively, for a baseline vehicle that does not include the air flow optimization device 10 in front of the radiator 12, intercooler 14 and condenser 16 and the same vehicle equipped with that device. As illustrated in FIG. 4a, in the baseline vehicle there is a dead zone of little or no air flow on the bottom half of the condenser which significantly reduces condenser performance (see box A in FIG. 4a). Further, as illustrated in box B of FIG. 4a, air flows upward in this area as it is not directed properly and as such does not even enter into the heat exchangers completely thereby providing no beneficial cooling effect.

In contrast, as illustrated in FIG. 4b (note box C) the vanes 26, 36 and air flow channels 28, 38 of the device 10 assist to more uniformly direct air flow into the radiator 12, intercooler 14 and condenser 16. Further, the device 10 functions to minimize the loss of air flow through package gaps between the radiator 12, intercooler 14 and condenser 16. In addition, the dead zone illustrated in box A of FIG. 4a is substantially eliminated by the air flow optimization device 10.

Figure 5:
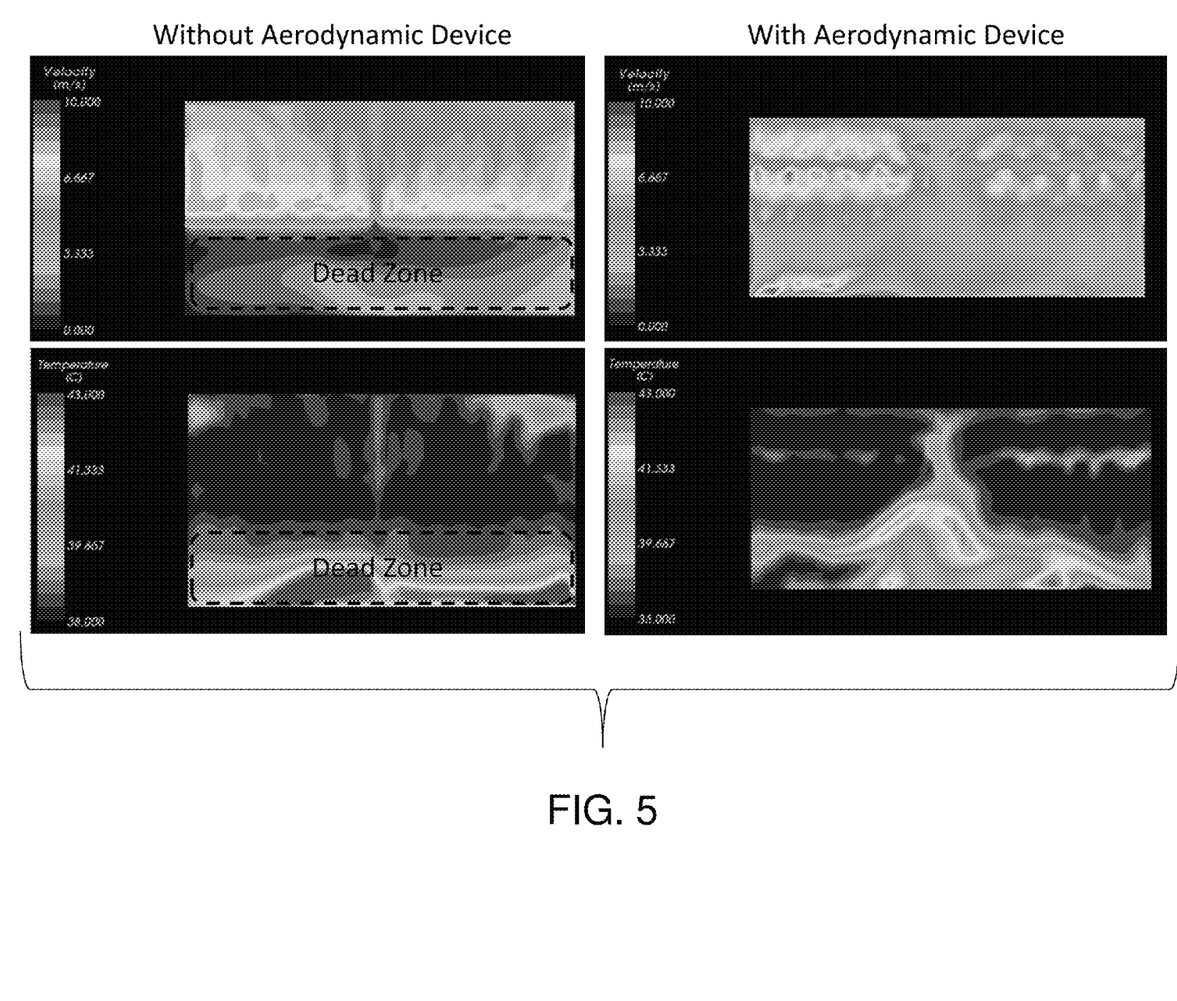
FIG. 5 is a comparative color illustration of the aerodynamic devices effect on the condenser core.

Reference is now made to FIG. 5 illustrating the effect of the air flow optimization device 10 on the condenser core. As illustrated in the upper left quadrant of FIG. 5, the dead zone A leads to a local high temperature zone. This results in a big temperature gradient on the heat exchanger core which reduces heat exchanger efficiency and adversely affects the service life of the condenser 16. This is because thermal stress occurs when large temperature differences exist and these differences tend to lead to heat exchanger tube failure. That temperature gradient is best illustrated in the lower left-hand quadrant of FIG. 5.

In contrast, as illustrated in the upper right and lower right quadrants of FIG. 5, the air flow optimization device 10 substantially eliminates the dead zone thereby substantially reducing the temperature gradient across the condenser 16. This increases the efficiency of operation of the condenser 16 and improves its service life as a result of a reduction of thermal stress (note particularly reduction of red color zone).

Figure 6:
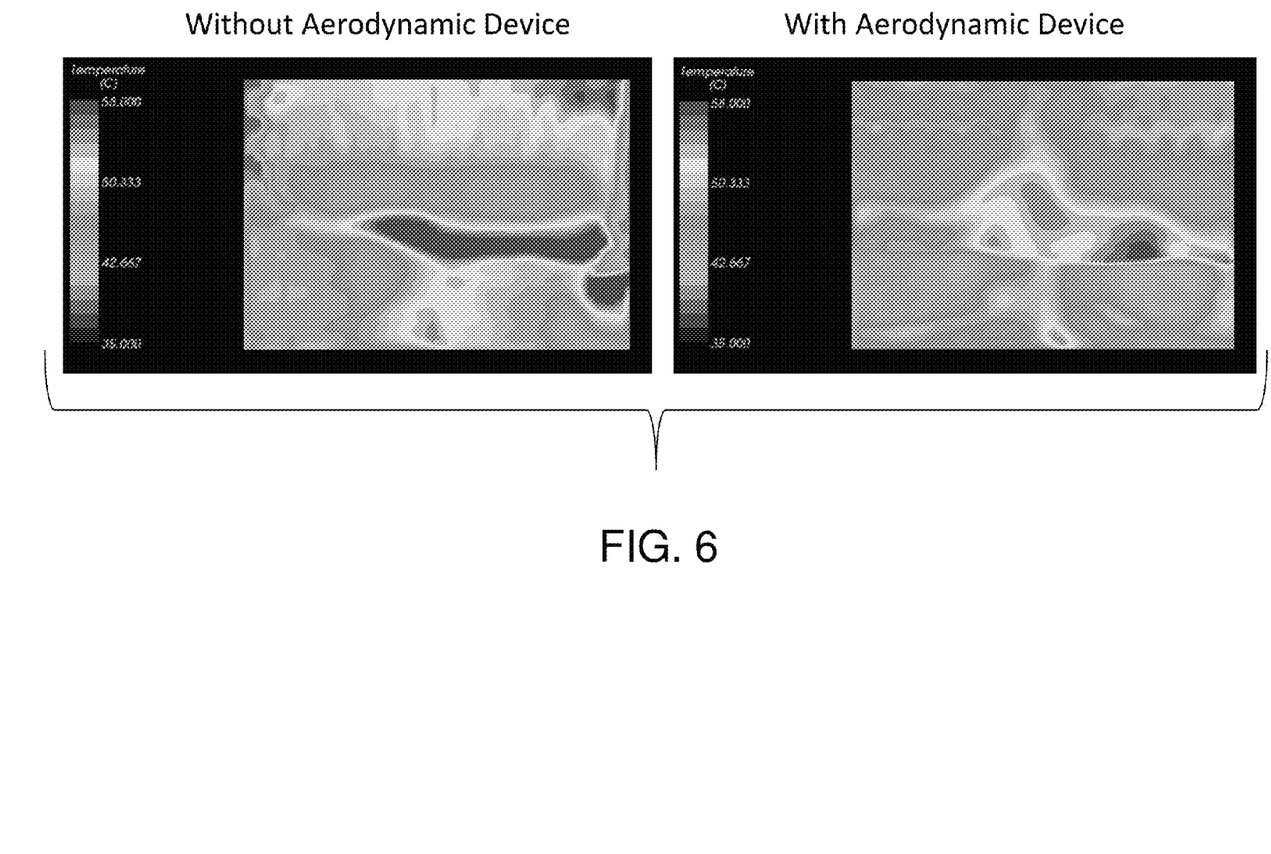
FIG. 6 is a comparative color illustration of the aerodynamic devices effect on the radiator core.

Reference is now made to FIG. 6 illustrating the effect of the air flow optimization device 10 on the radiator core. As illustrated in the thermal graph on the left of FIG. 6, the core of the radiator 12 in the absence of the air flow optimization device 10 is subjected to a large temperature gradient which is known to reduce the efficiency and service life of the part. As illustrated in the thermal graph on the right of FIG. 6, the temperature differential has been reduced in the presence of the air flow optimization device 10 which improves air flow distribution. Consequently, heat exchanger efficiency and service life are improved due to a reduction of thermal stress (note particularly the reduction of the red colored zone).

A radiator core air flow comparison is presented below in Table 1. As illustrated, the air flow optimization device 10 provided a 4.91% increase in air flow at 100 KpH, a 5.71 increase in air flow at 180 KpH and a 7.43% increase in air flow at 200 KpH. As noted above, this increase in air flow improves the efficiency of operation of the heat exchangers including the radiator 12, intercooler 14 and condenser 16 which also increases the performance of the vehicle. In fact, the vehicle top speed was increased by 35 KpH as a result of better cooling.

TABLE 1

| | Heat Exchanger | | |
|---|---|---|---|
| | Radiator | | |
| Vehicle Speed | Without Aerodynamic Device | With Aerodynamic Device | % Air flow improvement |
| 100 kph | 3.87 | 4.06 | 4.91 |
| 180 kph | 5.95 | 6.29 | 5.71 |
| 200 kph | 6.46 | 6.94 | 7.43 |

A condenser core air flow comparison is presented in Table 2. At idle, there was a 9.63% air flow improvement when using the air flow optimization device 10. At 50 KpH there was an 8.92% air flow improvement when using the optimization device 10. At 100 KpH there was a 13.75% air flow improvement when utilizing the air flow optimization device 10. This was largely due to the elimination of the dead zone noted above in FIGS. 4a, 4b and 5. The resulting improvement in air flow allows the condenser to operate more efficiently thereby improving the performance of the vehicle air-conditioning system.

TABLE 2

| | Heat Exchanger | | | |
|---|---|---|---|---|
| | Condenser | | | |
| Vehicle Speed | Without Aerodynamic Device | With Aerodynamic Device | % Air flow improvement | A/C performance target |
| Idle | 2.7 | 2.96 | 9.63 | 2.85 |
| 50 kph | 3.25 | 3.54 | 8.92 | 3.4 |
| 100 kph | 4.51 | 5.13 | 13.75 | 4.8 |

In summary, numerous benefits are produced when using the air flow optimization device 10. The air flow optimization device 10 provides a more uniform air flow to improve the performance of the heat exchangers including the radiator 12, intercooler 14 condenser 16. The resulting improvement in cooling increases the operating efficiency of the vehicle engine and the vehicle air-conditioning system.

The more uniform air flow also helps to eliminate hotspots and provides more even temperature distribution in the core of the heat exchangers 12, 14, 16. This in turn minimizes the adverse effects of varying coefficient of thermal expansion thereby increasing the service life of the heat exchangers.

Advantageously, the air flow optimization device 10 is relatively inexpensive to produce. It does not include motors, moving vanes and linkage like shutter systems. The reduction in cost (as much as 62% compared to a shutter system of comparable size) and weight (as much as 33.33% less in weight) when compared to an automatic shutter system is substantial and, therefore, the air flow optimization device 10 is a more attractive alternative than a shutter system for many applications. It also eliminates potential warranty issues associated with a shutter system.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air flow optimization device for motor vehicle heat exchangers comprising:
    a body including a first air flow opening having an inlet side and an outlet side, a second air flow opening and a ribbed panel between the first and second air flow openings; and
    a series of fixed vanes provided across said first air flow opening and dividing said first air flow opening into a plurality of air flow channels.

2. The device of claim 1, wherein said fixed vanes extend at least partially across said body from said inlet side to said outlet side.

3. The device of claim 2, wherein said body includes a first perimeter around said first opening.

4. The device of claim 3, including a seal member extending around said first perimeter and projecting forwardly from said inlet side.

5. The device of claim 4, wherein said body further includes a second series of fixed vanes provided across said second opening and dividing said second opening into a second plurality of air flow channels.

6. The device of claim 5, wherein said body includes a second perimeter around said second opening.

7. The device of claim 6, including a second seal member extending around said second perimeter and projecting forwardly from said inlet side.

8. The device of claim 7, wherein said ribbed panel connects said first and second perimeters.

9. The device of claim 8, wherein said second air flow opening is below and partially offset from said first air flow opening.

10. The device of claim 9, wherein each air flow channel of said plurality of second air flow channels has a cross-sectional area of between about 4700 mm$^2$ and about 5050 mm$^2$.

11. The device of claim 10, wherein a ratio of total cross-sectional area of said first air flow opening to said second air flow opening is between about 1.32 to 1 and about 1.25 to 1.

12. The device of claim 9, wherein each air flow channel of said plurality of second air flow channels has a cross-sectional area of between about 4300 mm$^2$ and about 5450 mm$^2$.

13. The device of claim 8, wherein each air flow channel of said plurality of air flow channels has a cross-sectional area of between about 4300 mm$^2$ and about 5450 mm$^2$.

14. The device of claim 8, wherein each air flow channel of said plurality of air flow channels has a cross-sectional area of between about 4700 mm$^2$ and about 5050 mm$^2$.

15. A method for improving efficiency and performance and extending service life of a heat exchanger, comprising:
    uniformly distributing air flow through said heat exchanger by directing that air flow through an air flow optimization device including a pair of air flow openings connected by a ribbed panel, each of said openings including a plurality of fixed vanes dividing said pair of openings into a plurality of air flow channels.

16. An air flow optimization system for a motor vehicle, comprising:
    a heat exchanger;
    an air flow optimization device upstream from said heat exchanger, said air flow optimization device having:
        a body including a first opening, a second opening and a ribbed panel between said openings, each of said openings having an inlet side and an outlet side; and a series of fixed vanes provided across said openings and dividing said openings into a plurality of air flow channels, whereby said ribbed panel is orientated to direct air flow toward the plurality of air flow channels.

17. The system of claim 16, wherein said heat exchanger is selected from a group consisting of a radiator, an intercooler, a condenser and combinations thereof.

* * * * *